United States Patent [19]

Soch

[11] 4,356,273

[45] Oct. 26, 1982

[54] FLUOROCHEMICAL FOAM STABILIZER AND FOAMED POLYURETHANES MADE THEREWITH

[75] Inventor: Fredrich A. Soch, St. Paul, Minn.

[73] Assignee: Minnesota Mining and Manufacturing Company, St. Paul, Minn.

[21] Appl. No.: 218,967

[22] Filed: Dec. 22, 1980

Related U.S. Application Data

[60] Division of Ser. No. 34,383, Apr. 30, 1979, Pat. No. 4,289,892, which is a continuation of Ser. No. 20,113, Mar. 3, 1970, abandoned.

[51] Int. Cl.$^3$ .............................................. C08G 18/14
[52] U.S. Cl. ................................... 521/114; 521/115; 521/116; 521/164; 521/174
[58] Field of Search ............... 521/114, 115, 116, 164, 521/174

[56] References Cited

U.S. PATENT DOCUMENTS

| | | | |
|---|---|---|---|
| 2,842,506 | 7/1958 | Roussel | 260/2.5 |
| 3,398,182 | 8/1968 | Guenthner et al. | 260/455 |
| 3,419,532 | 12/1968 | Jackson | 521/174 |
| 3,423,339 | 1/1969 | Andrews et al. | 260/2.5 |
| 3,746,742 | 7/1973 | Schuierer et al. | 260/471 C |
| 3,880,782 | 4/1975 | Rambosek | 260/2.5 |
| 3,952,075 | 4/1976 | Nakamura et al. | 260/950 |
| 4,065,630 | 12/1977 | Sandler | 560/26 |

FOREIGN PATENT DOCUMENTS 1114428  5/1968  United Kingdom .

OTHER PUBLICATIONS

J. Am. Chem. Soc., 49, 3181 (1927).
Polyurethanes: Chemistry and Technology, Saunders and Frisch, Interscience Publishers (1962) Part I, pp. 63–72, 240, 241, 244, 245–249; Part II, pp. 1, 43, 44, 45, 67, 68, 69, 200, 204, 205, 206, 207, 208, 209, 210, 219, 220.
Handbook of Foamed Plastics by Bender, Lake Publ. Corp. (1965), pp. 133, 134, 137, 164, 177, 178, 180, 181, 182, 183, 184, 186, 190, 191, 198, 207, 208, 214, 215.

*Primary Examiner*—Maurice J. Welsh
*Attorney, Agent, or Firm*—Cruzan Alexander; Donald M. Sell; William G. Ewert

[57] ABSTRACT

Active hydrogen-containing fluorochemical is used as a foam stabilizer in preparing polyurethane foams. For example, rigid or flexible polyurethane foams with high or low density and uniform cellular structure are prepared using fluoroaliphatic radical-substituted poly(oxyalkylene) polyols as foam stabilizers.

13 Claims, No Drawings

FLUOROCHEMICAL FOAM STABILIZER AND FOAMED POLYURETHANES MADE THEREWITH

This is a division of application Ser. No. 034,383, filed Apr. 30, 1979, now U.S. Pat. No. 4,289,892, issued Sept. 15, 1981, which is a continuation of Ser. No. 020,113, filed Mar. 3, 1970, now abandoned.

This invention relates to foamed polyurethanes and their preparation. In another aspect, it relates to active hydrogen-containing fluorochemicals, such as fluoroaliphatic-substituted poly(oxyalkylene) polyols, and their preparation, and their use as foam stabilizers in the preparation of foamed polyurethanes.

The foamed (or cellular) polyurethane industry has enjoyed spectacular growth in the last decade. These foamed polymers are reaction products of polyisocyanates and active hydrogen-containing materials. Though there are three common foaming techniques used (i.e., one-shot, prepolymer, and semi-prepolymer techniques), these techniques all involve the reaction of these materials in the presence of catalysts, a blowing agent such as a fluorocarbon or carbon dioxide, and a foam stabilizer or surface active agent. The blowing agent expands the reaction product during the reaction to produce a foamed or cellular structure, the foam stabilizer aiding in controlling the cell structure to promote its uniformity and fineness. The foamed polyurethane can be produced as a flexible or rigid product of high or low density. Such cellular products can be made with a wide range of properties, the low density foams (sometimes referred to as semi-rigid foams) generally being useful as foamed-in-place thermal insulation, the rigid (or high density) foams being generally useful where structural strength is important, such as in construction, and the flexible cellular products being generally useful for cushioning, packaging, laminates, and insulation.

In general, the physical properties of the cellular product depend not only upon the particular reactants employed and their ratios but also upon the uniformity and size of the cells or voids within the product and whether the cells are open or closed. In order to prevent the development of non-uniform, coarse or large cells, or the collapse of the foam, it is common to include in the reaction system a foam stabilizer or cell size regulating agent. The most widely used foam stabilizers are silicone oils such as polydialkylsiloxanes and polyoxyalkylenesiloxane copolymers, e.g. Silicone L-520, such as described in British Pat. No. 1,114,428. These surfactants are made in a variety of molecular weights, solubilities, and viscosities to prepare cellular products having various cell sizes. Though useful cellular structure can be made with said silicone surfactants, the resulting cellular products often do not readily adhere to adhesives and substrates (which is typical of silicone-modified materials) and, in order to obtain uniform cell size, careful control must be used in choosing the right surfactant and catalyst and the amounts thereof must be extremely carefully balanced.

Briefly, in one aspect of this invention, cellular polyurethane products are prepared by foaming the precursor reaction mixtures thereof in the presence of fluorine-containing compound having a plurality of active hydrogen atoms. [The term "active hydrogen atom" means a hydrogen atom (other than an amido hydrogen atom) which is reactive with a Grignard reagent as described in *J. Am. Chem. Soc.*, 49, 3181, 1927. Amido hydrogen atoms, such as those present in —SO$_2$NH— and —CONH—, do not react with the isocyanate moiety under urethane bond forming conditions and therefore are not considered as "active hydrogen atoms" for purposes of this invention.] These fluorine-containing compounds (also referred to herein as foam stabilizers) can be described as fluoroaliphatic radical-substituted poly(oxyalkylene) polyols. A preferred class can be expressed in terms of the formula:

$$(R_f)_m Q_z[(RO)_x H_y]_n \qquad \text{I}$$

where $R_f$ is a fluorinated, saturated, usually monovalent, aliphatic radical, R is a polyvalent, and usually divalent, saturated aliphatic hydrocarbyl radical having 2 to 10 carbon atoms, such as derived from ethylene or 1,2-propylene oxides, H is an active hydrogen atom, Q is a linkage or bridge free of active hydrogen atoms and having a valence equal to m+n, m being an integer which is at least 1 and can be as high as 6 or higher, n being an integer of at least 1, and usually is 2, or can be as high as 5 or higher, z is an integer of 1-3, x is an integer of at least 25 and can be as high as 400 or higher, and y is an integer of 1-5, and preferably 1 to 3, the product ny being at least 2.

An example of a foam stabilizer of this invention has the formula:

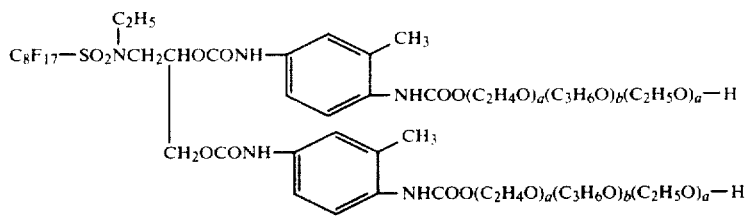

where a and b represent the number of the corresponding oxyalkylene units shown in the parentheses.

In preparing foamed polyurethane products according to this invention, polyisocyanate and active hydrogen-containing material, such as poly(oxypropylene) polyols, can be reacted in a conventional manner, for example by the so-called one-shot, prepolymer, or semi-prepolymer techniques, in the presence of catalyst, blowing agent, and other known adjuvants, together with the foam stabilizers of this invention. The resulting foamed or cellular product comprises a high percentage of uniform cells or voids and desirable physical properties, and also has a surface which readily adheres to common adhesives, such as acrylate-based, pressure-sensitive adhesives, or to non-porous substrates, such as steel panels.

The fluoroaliphatic radicals, $R_f$, of the foam stabilizers of this invention are stable, inert, non-polar moieties which are both oleophobic and hydrophobic. They can be straight chain, branched chain, and, if sufficiently large, cyclic, or combinations thereof, such as alkylcycloaliphatic radicals. The skeletal chain can include catenary oxygen and/or trivalent nitrogen hereto atoms bonded only to carbon atoms, such hetero atoms providing stable linkages between fluorocarbon groups and not interfering with the inert character of the $R_f$ radical. While $R_f$ can have a large number of carbon atoms, compounds where $R_f$ is not more than 20 carbon atoms will be adequate and preferred since large radicals usually represent a less efficient utilization of fluorine than is possible with smaller $R_f$ radicals. Generally, $R_f$ will have 4 to 20 carbon atoms, preferably 6 to about 12, and will contain 40-78 weight percent, preferably 50-78 weight percent, of fluorine. The terminal portion of the $R_f$ group has preferably at least three fully fluorinated carbon atoms, e.g. $CF_3CF_2CF_2-$, and the preferred foam stabilizers are those in which the $R_f$ group is fully or substantially completely fluorinated, as in the case where $R_f$ is perfluoroalkyl, $C_nF_{2n+1}$.

Generally, the foam stabilizer will contain about 4 to 25 weight percent, preferably about 6 to 18 weight percent, of carbon-bonded fluorine. If the fluorine content is less than about 4 weight percent, impractically large amounts of the foam stabilizer will generally be required, while fluorine contents greater than about 25 weight percent are unnecessary to achieve foam stabilization and thus represent an uneconomical use of fluorine.

The function of the linkage or bridge Q is to bond the fluoroaliphatic radicals, $R_f$, to the polyether moieties, $(RO)_xH_y$, of the compound. Q can be a valence bond, in which case a carbon atom of a fluoroaliphatic radical is bonded or linked directly to a polyether moiety. Q can also comprise one or more linking groups such as polyvalent aliphatic, e.g. $-CH_2CH_2-$ and $-CH_2CH(CH_2-)_2$, polyvalent aromatic, e.g.

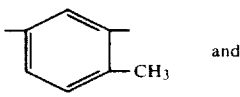
and

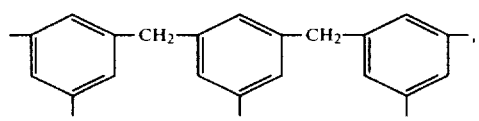

oxy, thio, carbonyl, sulfone, sulfoxy, $-N(C_2H_5)-$, oxyalkylene, sulfonamido, carbonamido, sulfonamidoalkylene, carbonamidoalkylene, urethane, e.g., $-CH_2CH_2OCONH-$ and

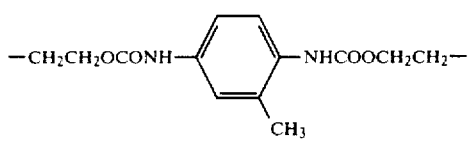

and urea, e.g., $-NHCONH-$. The linkage Q for a specific compound useful as a foam stabilizer will be dictated by the ease of preparation of such a compound and the availability of necessary precursors thereof.

From the above description of Q, it is apparent that this linkage can have a wide variety of structures, and in fact where it is a valence bond, it doesn't even exist as a structure. However large Q is, the fluorine content (the locus of which is $R_f$) of the compound is in the aforementioned limits set forth in the above description. While only one $R_f$ radical is sufficient to produce foamed products with desirable properties, i.e., where m in formula I, is 1, the foam stabilizers of this invention can have a plurality of $R_f$ radicals, e.g. m can be 2 to 6, or higher. This plurality of $R_f$ radicals can be spaced along a chain terminating in active hydrogen-bearing polyether moieties, as depicted by the structure:

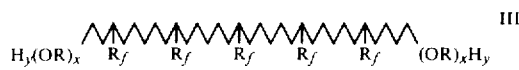

III
$H_y(OR)_x$ $R_f$ $R_f$ $R_f$ $R_f$ $R_f$ $(OR)_xH_y$ where the wavy line represents the linkage Q. Such compounds can be prepared, for example, by reacting two or more fluoroaliphatic radical-containing compounds, each having a plurality of active hydrogen atoms, with less than a stoichiometric amount of a polyisocyanate and then linking the resulting intermediate product to a polyether polyol, as will be described in detail hereinafter. Such resulting polyether polyols containing a plurality of $R_f$ groups have been found to provide effective foam stabilization at lower concentrations than the simple foam stabilizers of this invention having only one $R_f$ group.

Some of the compounds falling within the scope of formula I are known in the art, e.g. U.S. Pat. No. 2,915,554 (Ahlbrecht and Morin) and U.S. Pat. No. 3,470,258 (Tesoro), while others are novel per se and their preparation is described hereinafter.

Preferred foam stabilizers (which are novel per se) which can be used in this invention to make foamed polyurethanes are fluoroaliphatic radical-substituted poly(oxyalkylene) polyols of the formula:

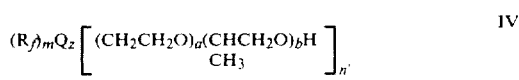

IV where $R_f$, Q, m, and z are as defined for formula I above, n' is an integer of at least 2 can can be a high as 6 or higher, and a and b designate respectively the number of oxyethylene and oxypropylene units shown in parentheses, and a+b is an integer of at least 5 and can be as high as 400 or higher. The weight ratio of oxyethylene units to oxypropylene units is preferably 20:80 to 80:20. The fluorine content of these compounds is in the aforementioned limits set forth for formula I and the average molecular weights of these compounds is at least 4500 to 100,000-200,000, or higher.

The fluoroaliphatic radical-substituted poly(oxyalkylene) polyols of formula IV can be obtained by several methods, such as by the oxyalkylation or condensation of ethylene oxide and 1,2-propylene oxide with fluorine-containing compounds having at least one Zerewitnoff active hydrogen atom, e.g. $R_fSO_2N(R')CH_2CH(OH)CH_2OH$, where R' is lower alkyl or hydrogen. Said oxyalkylation can be accomplished by known procedures, e.g. as described in U.S. Pat. No. 2,915,554 (Ahlbrecht and Morin), to produce active hydrogen-terminated copolymer poly(oxyalkylene) chains in which the oxyethylene and oxypropylene units are repeated in a random or block fashion within the chain.

An especially preferred subclass of the fluoroaliphatic radical-substituted polyols of formula IV is that where the poly(oxyalkylene) chain is composed of blocks of oxyethylene and blocks of oxypropylene, particularly where they form compounds of the formula:

$$(R_f)_mQ_z\left[(CH_2CH_2O)_a(CHCH_2O)_b(CH_2CH_2O)_aH \atop CH_3\right]_{n'} \quad V$$

where $R_f$, Q, m, and z are as defined above for formula I, a, b, and n' are as defined for formula IV, the poly(oxyethylene) to poly(oxypropylene) weight ratio in the poly(oxyalkylene) chains being in the range of 20:80 to 80:20, preferably 40:60 to 60:40. The fluorine content and molecular weight of the compounds are the same as that of formula IV.

A convenient method of preparing the fluoroaliphatic radical-substituted poly(oxyalkylene) polyols of Formula V is the reaction of precursor fluorine-containing compounds, having one or more active hydrogen atoms, with an excess of an aliphatic or aromatic polyisocyanate, to form isocyanate-terminated adducts or intermediates which are then reacted with poly(oxyalkylene) polyols, such as glycols (the preferred polyols), triols, and tetrols. Reactions between functional groups containing active hydrogen atoms and the isocyanate moiety are well-known (see Sec. III of "Polyurethanes:Chemistry and Technology," Part I, by Saunders and Frisch, Interscience Publishers, 1962). In order to ultimately produce a foam stabilizer with at least two active hydrogen atoms, the isocyanate intermediate must have at least two —NCO groups, and in order to produce such intermediates, the total moles of isocyanate groups in the polyisocyanate reactant must be at least 2 or more than the total moles of active hydrogen atoms in the fluoroaliphatic reactant, and the total moles of active hydrogen atoms in the poly(oxyalkylene) polyol reactant must be at least 2 or more than the total moles of isocyanate groups in the isocyanate intermediate. By choosing the right poly(oxyalkylene) polyol reactant, i.e. one with the desired molecular weight, the desired fluorine content can be obtained. Typically, the molecular weight of this polyol reactant will be five to ten times as large as that of the fluoroaliphatic precursor.

Representative subclasses of fluoroaliphatic radical-substituted precursors which can be used to form the foam stabilizers in this invention, include:

$$R_fSO_2NHRCH_2OH,$$

where R is alkylene with 1-12 carbon atoms;

$$R_fSO_2NHRSH, \text{ and}$$

$$R_fCONHRSH,$$

where R is alkylene with 3-14 carbon atoms;

$$R_fSO_2NR'RCONH(RO)_xRNH_2, \text{ and}$$

$$R_f(RNH)_xRNH_2,$$

where R' is hydrogen or alkyl with 1-6 carbon atoms, R is alkylene of 2-12 carbon atoms, and x is 1 or greater;

$$R_fSO_2NR'Z(OH)_n$$

where R' is hydrogen or alkyl with 1-12 carbon atoms, Z is aliphatic, aromatic, alicyclic, or arylaliphatic, and n is at least 2;

$$R_fSO_2NR'Z(NH_2),$$

$$R_fCONHZ(NH_2)_2,$$

$$R_f(CH_2)_qOZ(NH_2)_2,$$

where R' is hydrogen or lower alkyl, Z is a 2,4-substituted triazine ring, and q is 1-13;

$$R_fSO_2NH(CH_2)_nCOOH,$$

where n is 1-12;

$$R'_fOCH_2CH(R)OH, \text{ and}$$

$$R'_fO[CH_2CH(R)O]_nCH_2CH(R)OH,$$

where R is hydrogen or methyl and n is an integer of 1 or more, and $R'_f$ is a tertiary fluoroaliphatic radical;

$$R_fSO_2NR(CH_2)_m(OCH_2\overset{R'}{\underset{|}{C}H})_nOH.$$

where R is hydrogen or $$(CH_2)_n(OCH_2\underset{R'}{\overset{|}{C}H})_nOH,$$

R' is hydrogen or methyl, m is 2-3, and n is 2-20;

$$R_fQNRR'NH_2$$

where Q is sulfonyl or carbonyl, R is alkyl with 1-6 carbons, and R' is alkylene with 2-13 carbon atoms;

$$R_fRCOOH,$$

$$R_fRCH_2OH,$$

$$R_fQNHRCH_2OH, \text{ and}$$

$$R_fQNHRCOOH,$$

where Q is sulfonyl or carbonyl, and R is alkylene with 1-18 carbon atoms; and

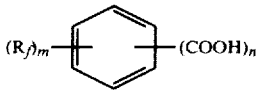

where m and n are integers of 1 or 2.

There is a host of prior art fluorine-containing compounds which have only a single active hydrogen atom. These can be reacted with epoxy alkanols, such as 2,3-epoxy-1-propanol, to form fluorine containing compound with two active hydrogen atoms (as part of hydroxyl groups) which can be used in this invention to form foam stabilizers which fall within the scope of formula I.

Specific precursor fluoroaliphatic radical-substituted compounds which can be used to prepare the foam stabilizers of this invention representatively include:

$CF_3(CF_2)_7SO_2N(CH_3)CH_2CH_2OH$ $CF_3(CF_2)_3SO_2N(CH_3)CH(CH_3)CH_2OH$ $CF_3(CF_2)_7SO_2N(CH_2CH_3)CH_2CH_2OH$ $CF_3(CF_2)_3SO_2N(CH_3)CH_2CH(CH_3)OH$ $CF_3(CF_2)_7SO_2N(CH_2CH_3)CH_2CH_2OH$ $CF_3(CF_2)_9SO_2N(CH_2CH_2CH_3)CH_2CH_2OH$ $CF_3(CF_2)_7SO_2N(CH_2CH_2CH_3)CH_2CH_2OH$ $CF_3(CF_2)_7SO_2N(CH_3)(CH_2)_5SH$ $CF_3(CF_2)_7SO_2N(C_2H_5)CH_2COOH$ $CF_3(CF_2)_7SO_2N(C_2H_5)(CH_2)_6OH$ $CF_3(CF_2)_7SO_2N(C_2H_5)(CH_2)_{11}OH$ $CF_3(CF_2)_7SO_2N(C_4H_9)CH_2)_4OH$ $CF_3(CF_2)_7SO_2N(CH_3)(CH_2)_4OH$ $CF_3(CF_2)_7SO_2N(CH_2CH_3)CH_2CH_2NH_2$ $[CF_3(CF_2)_7SO_2N(CH_2CH_3)CH_2CH_2]_2NH$ $CF_3(CF_2)_7SO_2N(CH_2CH_3)CH_2CH_2N(CH_3)H$ $CF_3(CF_2)_7SO_2N(CH_3)CH_2CH_2SH$ $CF_3C_6F_{10}C_2F_4SO_2N(CH_3)CH_2CH_2OH$ $C_2F_5O(C_2F_4O)_3CF_2CONHC_2H_4OH$ $CF_3(CF_2)_7SO_2N(C_3H_7)CH_2OCH_2CH_2CH_2OH$ $$\begin{array}{c} CF_3CF_2 \\ \diagdown \\ \phantom{O} \\ O \\ \diagup \\ CF_3CF_2 \end{array} \begin{array}{c} F \phantom{x} F_2 \\ C{-}C \\ \phantom{x} \\ C{-}C \\ F \phantom{x} F_2 \end{array} NCF_2CF_2SO_2N(CH_3)CH_2CH_2OH$$

$CF_3CF(CF_2Cl)(CF_2CF_2)_6CF_2CON(CH_3)CH_2CH_2OH$

TI $\quad CF_3CF(CF_2H)(CF_2CF_2)_6CF_2CONHCH_2CH(OH)CH_2OH$ $CF_3(CF_2)_7SO_2CH_2CH_2OH$ $CF_3(CF_2)_7SO_2N(CH_3)CH_2CH_2SH$ $C_7F_{15}CON(C_2H_5)C_2H_4OH$ $CF_3(CF_2)_7CH_2CH_2CH_2OH$ $$CF_3(CF_2)_7CH_2(CF_2CHO)_6H$$
$$\underset{CH_2OH}{|}$$

A wide variety of poly(oxyalkylene) compounds having at least one functional group containing active hydrogen can be used to prepare the foam stabilizers of this invention. Poly(oxyalkylene) polyols with a wide range of molecular weights which are commercially available and can be used for this purpose include, for example, those set forth in Appendix B of Saunders & Frisch, supra. The foam stabilizers of formula V are conveniently made using the poly(oxyalkylene) polyols which are sold under the trademark "Pluronic," those having molecular weights of 1500 to 3000 being particularly suitable.

The following series of reactions illustrate a specific example of preparing compounds of formula V.

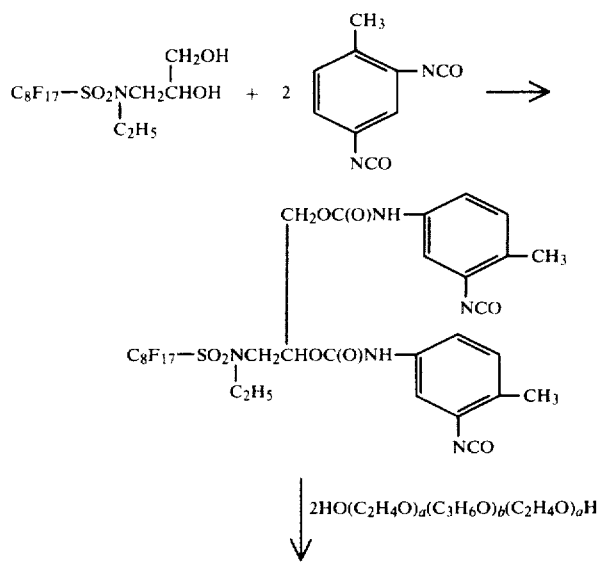

-continued

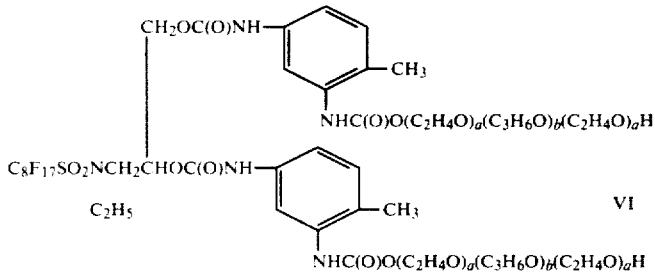

VI

Though the above shows the formation of a single compound, VI, for purposes of simplicity and brevity, the product actually formed will be a complex mixture of analogous compounds due to the use of precursor fluoroaliphatic reactants in which the $R_f$ radical represents a mixture of isomeric and homologous structures, the use of diisocyanate reactants which are isomeric mixture, and the use of polyol reactants comprising a mixture in which the number of oxyalkylene units varies about an average, and also due to the fact tht the reaction of the isocyanate-terminated intermediate and polyol reactant results in minor amounts of coupling products not illustrated above but which are described hereinafter.

Note that in the preparation of the compound of formula VI that one mole of the precursor fluoroliphatic compound is reacted with two moles of the diisocyanate to produce an isocyanate intermediate having two isocyanate groups, and that the resulting intermediate is reacted with two moles of poly(oxyalkylene) glycol to produce the compound of formula VI, the latter having one $R_f$ radical and two poly(oxyalkylene) chains of which is terminated by a hydroxyl group. By varying the molar ratio of the precursor fluoroaliphatic reactant, $R_fA(OH)_2$, to toluene diisocyanate reactant, $R(NCO)_2$, and/or the molar ratio of the isocyanate intermediate to poly(oxyalkylene)glycol reactant, $HO—R_o—OH$, the number of $R_f$'s and hydroxyl-terminated poly(oxyalkylene) chains can be varied, as illustrated by the following equations.

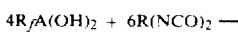

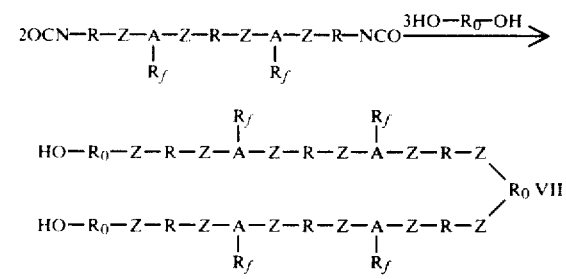

The compound of formula VII has four $R_f$ groups and two poly(oxyalkylene) chains, $—R_o—$, each terminating with a functional group ($—OH$) having an active hydrogen atom. The portion of the compound bonding the $R_f$ groups to these active hydrogen atoms includes sulfonamidoalkylene linkages, A, tolylene nuclei, R, interposed or linked between urethane linkages, Z, and includes a divalent poly(oxyalkylene) group, $R_o$. Said portion can be considered as the linking group Q of formula I.

Though it is convenient to react the precursor fluoroaliphatic reactant with a diisocyante reactant to prepare the isocyanate intermediate (because of the commercial availability of diisocyanate)—which choice dictates that the starting compound contain at least two active hydrogen atoms—it is to be understood that polyisocyanates with more than two isocyanate groups can be reacted with precursor fluoroaliphatic compounds containing only one active hydrogen atom. Thus, one mole of $R_fAOH$ can be reacted with one mole of $R(NCO)_3$ to produce $R_fAZR(NCO)_2$, which in turn can be reacted with two moles of $HO—R_o—OH$ to produce $R_fAZR(ZR_oOH)_2$. Alternatively, a mole of $R_fA(OH)_2$ can be reacted with two moles of $R(NCO)_3$ to produce $R_fA[ZR(NCO)_2]_2$, which in turn can be reacted with four moles of $HO—R_o—OH$ to produce $R_fA[ZR(ZR_oOH)_2]_2$.

Polyisocyanates which can be used to prepare isocyanate-terminated intermediates of the foam stabilizers of this invention include conventional aliphatic or aromatic polyisocyanates. One of the most useful polyisocyanates which can be used here is tolylene diisocyanate, particularly as a blend of 80 weight percent of toluene-2,4-diisocyanate and 20 weight percent of toluene-2,6-diisocyanate. A 65:35 blend of the 2,4- and 2,6-isomers is also useful. These polyisocyanates are commercially available under the trademarks Hylene TM, Nacconate 80, and Mondur TD-80. Other useful polyisocyanates which can be used are other isomers of tolylene diisocyanate, hexamethylene-1,6-diisocyanate, diphenylmethane-4,4'-diisocyanate, m- or p-phenylene diisocyanate, and 1,5-naphthalene diisocyanate. Polymeric polyisocyanates can also be used, such as methylene bis(4-phenyl) isocyanate and polyaryl polyisocyanate, which are sold under the trademarks MDI and PAPI, respectively. A list of useful commercially available polyisocyanates is found in "Encyclopedia of Chemical Technology," by Kirk and Othmer, 2nd Ed., Vol. 12, pp 46-47, Interscience Pub., (1967), and in Appendix A of Polyurethanes: Chemistry & Technology, Part 1, supra.

In preparing said isocyanate-terminated intermediates, the precursor fluoroaliphatic reactant and polyisocyanate can be reacted in the presence of conventional catalysts used in making polyurethanes, such as described in Saunders and Frisch, Chap. IV, supra.

The amount of the foam stabilizer used in making foamed polyurethanes in accordance with this invention will vary depending upon the particular polyisocyanate and active hydrogen-containing reactants and catalysts used in making the polyurethane, and will also depend on the fluorine content of the foam stabilizer used and its molecular weight. Foam stabilizers having a high fluorine and/or a high molecular weight can be used in lower amounts. Amounts as high as 20 weight percent, based on the weight of the total polyurethane formulation or resin, can be used but generally it will be uneconomical and unnecessary to use such high amounts. Amounts less than about 0.1 weight percent will be generally ineffective. Usually 0.5 to 5 weight percent of foam stabilizer will provide satisfactory foams with a high percent of uniform cells.

In using the foam stabilizers of this invention to prepare foamed polyurethanes, conventional foaming techniques can be followed (e.g., the same techniques followed when conventional silicone oils are used as foam stabilizers). Such conventional foaming techniques, including the one-shot, prepolymer, and quasi-prepolymer techniques, and the reactants and adjuvants used in making foamed polyurethanes, including polyisocyanate and active hydrogen-containing reactants, catalysts, blowing agents, fillers, and the like, are described, for example, in "Polyurethanes: Chemistry and Technology," by Saunders & Frisch, Interscience Pub., Part I (1962), especially Chap. V and Part II (1964), especially Chaps. VII and VIII, and "Handbook of Foamed Plastics," by Bender, Lake Pub. Corp. (1965), especially Sec. IX, X, and XI, and such patents as U.S. Pat. No. 3,423,339. Generally, the polyisocyanate reactant, active hydrogen-containing reactant, e.g. poly(oxypropylene) polyol, catalyst, blowing agent, and foam stabilizer of this invention will be mixed together in a blender or mixing chamber, and the mix transferred to suitable mold or cavity to be filled or extruded onto a moving belt or the like. The foam mix can also be applied to large surfaces by spraying. If desired, one or more of the ingredients can be preheated before mixing takes place. Process conditions, such as temperature, pressure, reaction time, and order of addition, will be conventional and are not critical.

The amount of polyisocyanate reactant used to make the cellular products of this invention can vary, depending on the particular cellular product desired and its properties. Generally, the amount can be in the range of 0.9 to 12 equivalents or isocyanato groups per equivalent of active hydrogen atom in the polyol reactant, and even higher, e.g. up to 20/1 to 40/1. Those cellular products made from reaction mixtures with NCO/OH ratios of 0.9/1 to 5/1, particularly 0.9/1 to 1.5/1, can be characterized as polyurethanes, while those having higher ratios can be characterized as polyisocyanurate-polyurethanes, the latter being highly crosslinked and having both isocyanurate linkages and urethane linkages in the polymer backbone with the amount of the NCO group in the polyisocyanate reactant converted to isocyanurate linkages being 20-80%. (A portion of the hydroxyl content necessary to satisfy said NCO/OH ratios can be replaced by —NH$_2$ groups, particularly where high strength foams are desired.) Use of water for blowing produces urea linkages also.

Both rigid and flexible foamed polyurethanes, with high or low density, can be prepared by using the foam stabilizers of this invention. Product densities can vary from as high as 50 lbs./ft$^3$, or higher, such as required for abrasion-resistant coatings, to as low as 1 lb./ft$^3$, or less, such as desirable for thermal insulation, although usually the product density will be in the range of 1.5 to 25 lbs./ft$^3$.

The cellular products produced according to this invention can be used in the same applications that cellular polyurethanes have enjoyed heretofore. Rigid cellular products can be used as thermal insulation for refrigerators, freezers, cold storage warehouses, insulated railroad cars, pipes, and the like. Flexible cellular products of this invention can be used for cushioning, packaging, laminates, sound and thermal insulation, and filtration applications.

Objects and advantages of this invention are further illustrated in the following examples, but it should be understood that the materials and the amounts thereof recited in these examples as well as the various steps and other details and the results obtained, are merely illustrative and should not be construed to unduly limit this invention. Parts recited in these examples are parts by weight.

EXAMPLE 1

This example describes the preparation of foam stabilizers of this invention.

One mole (600 g.) of $C_8F_{17}SO_2N(C_2H_5)CH_2CH(OH)CH_2OH$ was dissolved in 2 liters of dried toluene and added to a glass-lined reactor equipped for temperature control, stirring and distillation. The solution was heated to about 50° C. with stirring and then 2 moles (350 g.) of tolylene diisocyanate (Mondur 80) (80:20 mixture of 2,4- and 2,6-isomers) were added with stirring, followed by the addition of 0.5 g. of triethylamine. An exotherm occurred, and heating was continued at 80°-100° C. for 2 hrs. The mixture was cooled to 60° C. and 2 moles (4,000 g.) of Pluronic L-44 polyol (having a molecular weight of 2,000 and containing about 40 weight percent oxypropylene) was added. The resulting mixture was heated to 100° C. with stirring and heating continued for another 2 hrs. The resulting product has structure like that shown in formula VI.

EXAMPLE 2

This example described the preparation of another foam stabilizer of this invention.

Twenty-five parts of $C_8F_{17}SO_2NH_2$, 150 parts of water, 1.4 parts of sodium hydroxide, 16.6 parts of ethylene chorohydrin, and 15 parts of dioxane were added to a reactor fitted for agitation, heating, cooling, and draining. The mixture was stirred and heated to obtain a clear solution. When the mixture reached 80° C., a solution of 5.4 parts of sodium hydroxide in 30 parts of water was slowly added. Stirring was continued for about 2 hrs. at about 80° C. and the mixture was allowed to cool to room temperature. The aqueous mixture was extracted with 150 parts of ethyl acetate. The ethyl acetate extract was washed successively with 50 parts of a 5 wt. % aqueous sodium chloride solution. Evaporation of the solvent left a residual product of $C_8F_{17}SO_2N(CH_2CH_2OH)_2$ in about 85% yield.

The $C_8F_{17}SO_2N(CH_2CH_2OH)_2$ product was then used as a precursor for preparing a foam stabilizer following the procedure of Example 1.

EXAMPLE 3

The two foam stabilizers prepared as described above in Examples 1 and 2 were used in making polyurethane foams according to the one-shot foaming technique. The formulations used for such polyurethane products are given in Table I.

TABLE I

| Foam ingredients | A. Rigid | B. Low density | C. Flexible |
|---|---|---|---|
| Poly(oxypropylene)diol, PPG 2025 (equiv. wt. 1000) | | | 6.0 |
| Poly(oxypropylene)triol, LG 56 (equiv. wt. 1000) | | | 24.0 |
| Poly(oxypropylene)triol, TP 440 (equiv. wt. 141) | 15.0 | 15.0 | |
| Poly(oxypropylene)pentol, LA 475 (equiv. wt. 118) | 15.0 | 15.0 | |
| Tolylene diisocyanate (80:20 2,4-, 2,6-) | 20.4 | 20.4 | 11.5 |
| N—ethylmorpholine | | | 0.15 |
| Stannous octoate (as a 25 wt. % soln. in mineral oil) | 0.0075 | 0.0075 | 0.025 |
| Fluorotrichloromethane | 11.0 | 16.5 | |
| Water (added) | | | 0.9 |
| Foam stabilizer | 2.25 | 4.5 | 1.5 |
| Foam density, lbs./ft.$^3$ | 2.3 | 1.5 | ca 2.0 |

In making the above-described polyurethane products, in each case the polyol components, catalyst (if used) and foam stabilizer were blended in a 250 ml. glass beaker with a motor-driven propeller and stirrer operating at about 500 rpm. The blowing agent (fluorotrichloromethane, or water) was then added, immediately followed thereafter by addition of the tolylene diisocyanate. Stirring was continued for 10–20 sec. to insure complete mixing and the contents of the beaker were rapidly poured into a waxed-paper cylindrical container, 8.5 cm. in diameter and 16 cm. in height. The resulting foam was allowed to stand at ambient temperature for about 5 min. and was then placed in a circulating air oven at 165° C. for about 15 min. to complete cure. Following this procedure, each of the three types of foamed polyurethane products, using the foam stabilizers of this invention, were stabilized. The rigid foams of formulations A and B had a high percentage of uniform, closed cells, and the flexible foam of formulation C had a high percentage of uniform, small open cells.

By comparison, adducts prepared by reacting equimolar amounts of $C_8F_{17}SO_2N(C_2H_5)CH_2CH_2OH$ and tolylene diisocyanate, and then reacting the resulting adduct with an equimolar amount of Pluronic L-44, L-64, or L-84, or PPG-3000 glycols, or reacting 2 moles of said adduct with 1 mole of Pluronic L-44 or L-84, produced stabilized polyurethane foams when evaluated as foam stabilizers only at levels substantially above 5 wt. %, based on the weight of the foam, notwithstanding that they had fluorine contents in the range of 5 to 20 wt. %.

EXAMPLE 4

In a series of runs a number of fluoroaliphatic radical-substituted polyols were prepared and evaluated as foam stabilizers at levels of 1 and 5 wt. % in a flexible polyurethane foam formulation set forth as formulation C in Table I. These materials evaluated as foam stabilizers were prepared by reacting a fluoroaliphatic compound shown in Table II with tolylene diisocyanate (80:20 mixture of 2,4- and 2,6-isomers) and reacting the resulting isocyanate-terminated intermediate with a poly(oxyalkylene) polyol set forth in Table III, using various molar ratios and generally following the procedure described in Example 1. This series of runs and the results obtained are summarized in Table IV.

TABLE II

| $R_f$ compound designation | Formula |
|---|---|
| I | $C_8F_{17}SO_2N(C_2H_5)CH_2CH(OH)CH_2OH$ |
| II | $C_8F_{17}SO_2N(CH_2CH_2OH)_2$ |
| III | $C_8F_{17}SO_2N(C_2H_5)CH_2CH_2OH$ |

TABLE III

| Polyol designation | Polyol trademark | Poly(oxyethylene) content, wt. % | Poly(oxypropylene) content, wt. % | Molecular weight |
|---|---|---|---|---|
| A | PPG 2025 | 0 | 100 | 2000 |
| B | Pluronic L42 | 20 | 80 | 1500 |
| C | Pluronic L35 | 50 | 50 | 1900 |
| D | Pluronic L44 | 40 | 60 | 2000 |
| E | Pluronic L64 | 40 | 60 | 2900 |

TABLE IV

| Run | $R_f$ compound Designation[c] | Mols | Mols of TDI | Poly(oxyalkylene) polyol Designation[d] | Mols | Foam stabilizer Mol. wt. | Wt. % F | Stabilization of polyurethane at 1% | at 5% |
|---|---|---|---|---|---|---|---|---|---|
| 1 | I | 1 | 2 | B | 2 | 3950 | 8.2 | no | no |
| 2 | I | 1 | 2 | B | 1.5 | 6400 | 10.1 | " | " |
| 3 | I | 1 | 2 | A | 2 | 4950 | 6.5 | " | no[b] |
| 4 | I | 1 | 2 | E | 2 | 6750 | 4.8 | " | no[b] |
| 5 | I | 1 | 2 | A | 1.5 | 7900 | 8.2 | " | no |
| 6 | I | 1 | 2 | D | 2 | 4950 | 6.5 | " | yes |
| 7 | I | 1 | 2 | D | 1.5 | 7900 | 8.2 | yes | " |
| 8 | I | 1 | 2 | D | 1.4 | 9370 | 8.6 | " | " |
| 9 | I | 2 | 3 | D | 1.5 | 9450 | 14.3 | " | " |
| 10 | I | 1 | 2 | C | 2 | 4750 | 6.8 | no | " |
| 11 | I | 1 | 2 | C | 1.5 | 7600 | 8.5 | yes | " |
| 12 | II | 1 | 2 | D | 1.4 | 9350 | 8.6 | " | " |
| 13 | II | 1 | 2 | C | 1.5 | 7470 | 8.7 | " | " |
| 14 | II | 1 | 2 | D | 1.5 | 7770 | 8.3 | " | " |
| 15 | I | 2 | 3 | C | 1.5 | 9150 | 14.1 | " | " |
| 16 | III | 1 | 1[a] | D | 1.5 | 4560 | 14.0 | " | " |

[a] The polyisocyanate used in this Run 16 was PAPI. (experimental equivalent weight 99).
[b] When the foam stabilizer of Runs 3 and 4 were used at a 20 Wt. % level, stable foams were produced.
[c] See Table II for description of $R_f$ compound.
[d] See Table III for description of polyol.

EXAMPLE 5

Various foam stabilizers described and used in Example 4 were used in making another series of rigid and flexible polyurethane products, using formulation like A and C set forth in Table I. The densities of the resulting products and the nature of their cellular structure were measured and examined. This series of runs and results obtained are summarized in Table V. In determining the nature of the cellular structure, the samples of foam were cut in a center plane parallel to the direction of rise and the average number of cells per lineal inch was determined over the top, center, and bottom secitons of the sample.

TABLE V

| Stabilizer used* | Rigid polyurethane properties | | Flexible polyurethane properties | |
|---|---|---|---|---|
| | Density lbs./ft$^3$ | Nature of cells | Density lbs./ft$^3$ | Nature of cells |
| 3 | 2.8 | very coarse | | foam collapsed |
| 1 | 2.9 | very coarse | | foam collapsed |
| 6 | 3.1 | 30 cells/in. | | foam collapsed |
| 4 | | foam collapsed | | foam collapsed |
| 10 | 2.5 | 50 cells/in. | | foam collapsed |
| 13 | 2.2 | 100–120 cells/in. | 2 | 50–60 cell/in. |
| 14 | 2.3 | 100–120 cells/in. | 2 | 50–60 cell/in. |
| 12 | 2.2 | 120–140 cells/in. | 2 | 50–60 cell/in. |
| 15 | 2.2 | 120 cells/in. | 2 | 50–60 cell/in. |
| 16 | 2.5 | 50–75 cells/in. | | foam collapsed |

*The number of the stabilizer used corresponds to the run number of Table IV.

EXAMPLE 6

Two low density polyurethane foams were prepared using a formulation like formulation B described in Table I. One of the foam products was made using the foam stabilizer of Run 12 of Table IV and the other foam product was made using Silicone L-520 as the foam stabilizer. Both products had a density of 1.3 lbs./ft$^3$. Discs measuring 0.8" in diameter and 0.125" thick were cut from the interior of each sample and the closed cell character of each disc determined. This determination was carried out by peripherally cementing the disc in a glass tube and applying air pressure (3" head of water) to one end of the tube and measuring the flow through the tube with a Rotometer dynamic flow meter. (The open tube, i.e., the tube without any disc mounted therein, had a measured flow rate of 19.6 scale units). The tube with the disc cut from the bottom of the silicone-stabilized foam had a flow rate of 0.5 scale units, and the tube with the disc cut from the upper part of the silicone-stabilized foam had a flow rate of 1.8 scale units. The tube with the disc cut from the stabilized foam made with the foam stabilizer of Run 12 of Table IV had no measurable air flow. Similarly, a disc cut from a low density polyurethane foam sample having a density of 1 lbs./ft$^3$. and made with 1.2 g. of said foam stabilizer of said Run 12, allowed substantially no air flow through the tube.

EXAMPLE 7

Two samples of flexible polyurethane foam were prepared using formulation C set forth in Table I. One of these samples was prepared using the foam stabilizer of Run 12 of Table IV and the other was prepared by using Silicone L-520 as the foam stabilizer. Blocks measuring 2½"×6"×½" were cut from each foam sample and tested for adhesion strength, following generally Method A (180° peel) of ASTM D 1000-68. In carrying out this test, strips of ½" wide vinyl electrical pressure-sensitive adhesive tapes (Scotch Brand No. 88, described in U.S. Pat. No. 3,129,816), were placed on each block, the strips covered with an aluminum plate weighted with a 5 lb. weight, and the assembly held for 30 min. at room temperature. The strips were then removed form the blocks by pulling them at an angle of 180° from the surface at a rate of 12 in./min., the force required to remove the strips being registered on a spring balance. The force required to remove the strips from the silicone stabilized foam varied from 100 to 133 g., the tape being released from the surface without marring the same. The force required to remove the tapes from the foam stabilized with the foam stabilizer of this invention varied from 270 to 350 g., the upper limit being observed when fragments of foam were removed from the surface of the block by the tape, the release being primarily from the cleaving of the foam rather than release of the tape from the surface of the block.

EXAMPLE 8

In this example, eight rigid, flame-retardant, polyurethane-polyisocyanurate foams were prepared as follows, using two foam stabilizers of this invention at different levels. A mixture was made up of 25 parts each of two different polyoxypropylene triols (one, TP 440, with an equivalent weight of 150, and the other, TP 740, with an equivalent weight of 250), 20 parts of a high molecular weight polyvinyl chloride (sold as PVC 71 AH, with an inherent viscosity of 1.30 and a specific viscosity of 0.057), and 17.8 parts of $Sb_2O_3$. The mixture was then mixed with 0.247 part water, 0.015 part lead octoate, 0.3 part tertiary amine (THANCAT DME), 1.0 part of a potassium orthoborate, and either 0.25, 0.50, 1.0 or 2.0 parts of a foam stabilizer (that of Runs 6 or 12 of Table IV); the resulting mixture (Part A) was then mixed with 162 parts of an NCO-capped prepolymer (Part B). The resulting foam mix, having an equivalent NCO/OH ratio of 6/1, was mixed for 30 sec. with an air-driven mixer and then further mixed by hand for 10–15 sec. The resulting foam was allowed to stand 14 min. and then further cured at 225° F. for 10–20 min. In each of the eight runs, rigid foams having a density fo about 20 lbs./ft$^3$. were produced with a high percentage of uniform, small closed cells.

The NCO-capped prepolymer used in the above runs had a viscosity fo 1840 cps. and an isocyanate number of 216. The prepolymer was prepared by reacting 155 parts of methylene bis(phenylisocyanate) (Isonate 125) with a mixture of 23.75 parts of a 200-molecular weight polypropylene ether glycol and 26 parts of a 2000-molecular weight polypropylene ether glycol. The potassium orthoborate catalyst used in the above runs was prepared by heating 4.5 moles of triethylene glycol and 0.75 mole of powdered boric acid to about 130° C. under vacuum until the evolution of by-product water ceased, and then adding 0.75 mole of potassium hydroxide, the resulting catalyst having a K/B atom ratio of about 1/1.

Various modifications and alterations of this invention will become apparent to those skilled in the art without departing from the scope and spirit of this invention, and it should be understood that this invention is not to be unduly limited to the illustrative embodiment set forth herein.

I claim:

1. In a process for preparing a foamed polyurethane, the improvement comprising using a fluoroaliphatic radical-substituted poly(oxyalkylene)polyol as a foam stabilizer, wherein said stabilizer has the formula:

$(R_f)_m Q_z[(RO)_x H_y]_n$ where $R_f$ is a fluorinated, saturated, aliphatic radical, R is a saturated aliphatic hydrocarbyl radical, H is an active hydrogen atom, Q is a linkage free of active hydrogen atoms and having a valence of m+n, m and n are integers of at least 1, z is an integer of 1-3, x is an integer of at least 25, y is an integer of at least 1, and the product ny is at least 2.

2. The process according to claim 1, wherein said stabilizer has a fluorine content of 4-25 weight percent.

3. The process according to claim 1, wherein said hydrocarbyl is ethylene and/or 2,3-propylene.

4. In a process for preparing a foamed polyurethane, the improvement comprising using a fluoroaliphatic radical-substituted poly(oxyalkylene)polyol as a foam stabilizer, wherein said stabilizer has the formula:

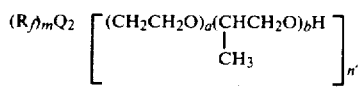

where $R_f$ is a fluorinated, saturated, monovalent, aliphatic radical, Q is a linkage free of active hydrogen atoms and has a valence equal to m+n', m is an integer of at least 1, n' is an integer of at least 2, a and b are integers of at least 1, the sum of a+b being at least 5 and the weight ratio of a:b being 20:80 to 80:20, said stabilizer having a fluorine content of 4-25 weight percent and an average molecular weight of at least 4500, and z is an integer of 1-3.

5. In a process for preparing a foamed polyurethane, the improvement comprising using a fluoroaliphatic radical-substituted poly(oxyalkylene)polyol as a foam stabilizer, wherein said stabilizer has the formula:

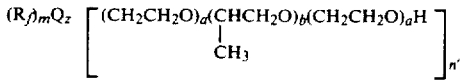

where $R_f$ is a fluorinated, saturated, monovalent, aliphatic radical, Q is a linkage free of active hydrogen atoms and having a valence equal to m+n', m is an integer of at least 1, n' is an integer of at least 2, and a and b are integers of at least 4 and designate blocks of oxyethylene and oxypropylene units respectively with the weight ratio of a:b being 20:80 to 80:20, said stabilizer having a fluorine content of 4-25 weight percent an an average molecular weight of at least 4500, and z is an integer of 1-3.

6. In a process for preparing a foamed polyurethane, the improvement comprising using a fluoroaliphatic radical-substituted poly(oxyalkylene)polyol as a foam stabilizer, wherein said stabilizer comprises:

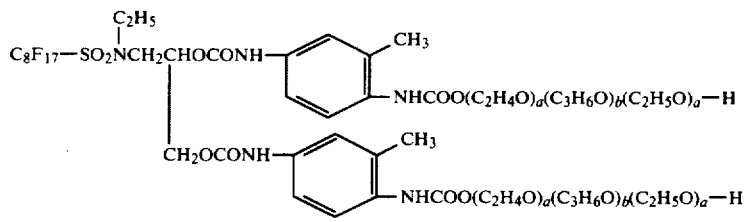

wherein a and b are integers of at least 4 and designate blocks of oxyethylene and oxypropylene units respectively, the ratio of oxyethylene units:oxypropylene units being 20:80 to 80:20, said stabilizer having a fluorine content of 4 to 25 weight percent.

7. A foamed polyurethane made according to the process of claim 1.

8. The process according to claim 4, wherein $R_f$ is also stable, non-polar, inert, oleophobic, and hydrophobic, has 4 to 20 carbon atoms, and 40 to 78 weight percent fluorine and terminating in at least three fully fluorinated carbon atoms.

9. The process according to claim 8, wherein said $R_f$ is straight chain, branched chain, cyclic, or a combination thereof and has a skeletal chain which can include catenary oxygen or trivalent nitrogen hetero atoms, or both said hetero atoms, bonded only to carbon atoms, and said Q is a valance bond or a polyvalent aliphatic, polyvalent aromatic, oxy, thio, carbonyl, sulfone, sulfoxy, —N(C₂H₅)—, oxyalkylene, sulfonamido, carbonamido, sulfonamidoalkylene, carbonamidoalkylene, urethane, or urea radical.

10. The process according to claim 9, wherein $R_f$ is perfluoroalkyl.

11. The process according to claim 5, wherein $R_f$ is also stable, non-polar, inert, oleophobic, and hydrophobic, has 4 to 20 carbon atoms, and 40 to 78 weight percent fluorine terminating in at least three fully fluorinated carbon atoms.

12. The process according to claim 11 wherein said $R_f$ is straight chain, branched chain, cyclic, or a combination thereof and has a skeletal chain which can include catenary oxygen or trivalent nitrogen hetero atoms, or both said hetero atoms, bonded only to carbon atoms, and said Q is a valence bond or a polyvalent aliphatic, polyvalent aromatic, oxy, thio, carbonyl, sulfone, sulfoxy, —N(C₂H₅)—, oxyalkylene, sulfonamido, carbonamido, sulfonamidoalkylene, carbonamidoalkylene, urethane, or urea radical.

13. The process according to claim 12 wherein $R_f$ is perfluoroalkyl.

* * * * *